(No Model.) 5 Sheets—Sheet 1.
G. W. SHARER.
BRICK KILN.

No. 385,209. Patented June 26, 1888.

WITNESSES.
Edwin L. Yewell,
John Enders Jr.

INVENTOR,
Geo. W. Sharer
per Hallock & Hallock
Attorneys.

(No Model.) 5 Sheets—Sheet 2.

G. W. SHARER.
BRICK KILN.

No. 385,209. Patented June 26, 1888.

WITNESSES.
Edwin L. Yewell,
John Enders Jr

INVENTOR,
Geo. W. Sharer
per Hallock & Hallock
Attorneys.

(No Model.) 5 Sheets—Sheet 4.
G. W. SHARER.
BRICK KILN.

No. 385,209. Patented June 26, 1888.

WITNESSES.
Edwin I. Yewell.
John Enders Jr.

INVENTOR.
Geo. W. Sharer
per Halleck & Halleck
Attorneys.

(No Model.)　　　　　　G. W. SHARER.　　　　5 Sheets—Sheet 5.
BRICK KILN.

No. 385,209.　　　　　　　　Patented June 26, 1888.

WITNESSES.　　　　　　　　　　　INVENTOR,
Edwin I. Yewell.　　　　　　　　Geo. W. Sharer,
Chas Helm.　　　　　　　　　per Hallock & Hallock
　　　　　　　　　　　　　　　　　　Attorneys.

UNITED STATES PATENT OFFICE.

GEORGE W. SHARER, OF TERRE HAUTE, INDIANA.

BRICK-KILN.

SPECIFICATION forming part of Letters Patent No. 385,209, dated June 26, 1888.

Application filed August 19, 1887. Serial No. 247,384. (No model.)

*To all whom it may concern:*

Be it known that I, GEORGE W. SHARER, a citizen of the United States, residing at Terre Haute, in the county of Vigo and State of Indiana, have invented certain new and useful Improvements in Brick-Kilns; and I do hereby declare the following to be a full, clear, and exact description of the invention, such as will enable others skilled in the art to which it appertains to make and use the same.

In working brick-kilns it is essential that the products of combustion passing through the different eyes be under complete control, as it often becomes necessary to check the draft in one or more of the eyes and to cause the products of combustion to pass through the other eye or eyes, as the case may be, to give increased heat in that part or parts of the kiln to which the eye or eyes lead. Various ways of introducing cold air into the eyes have been used; but none of them are effective for the reason that the air has never been introduced at the point of greatest heat—i. e., the upper part of the eyes.

The object of my invention is to overcome these defects; and to that end the nature of the invention consists of constructions and combinations, all as will hereinafter be described in the specification, and pointed out in the claims, reference being had to the accompanying drawings, in which—

Figure 1:
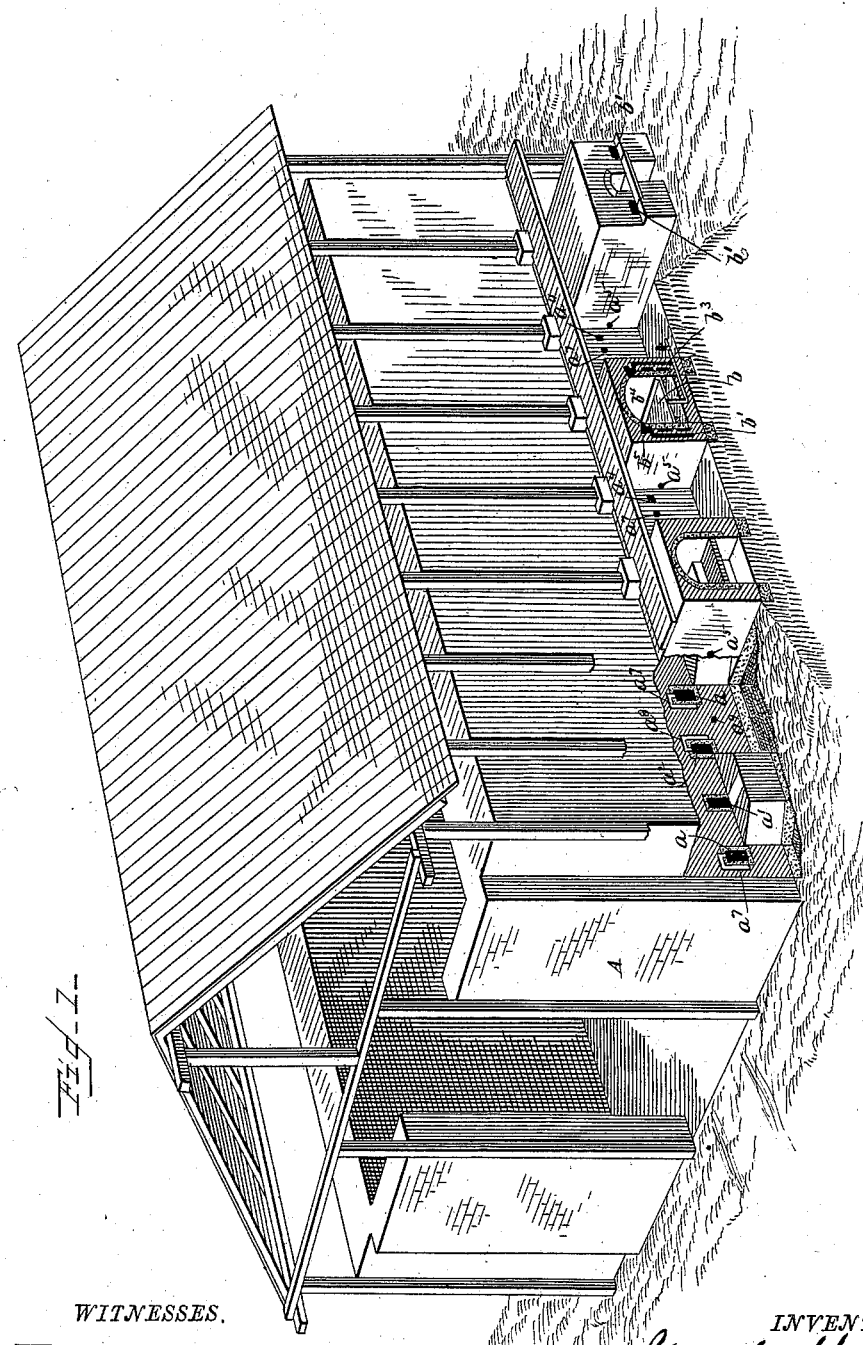
Figure 2:
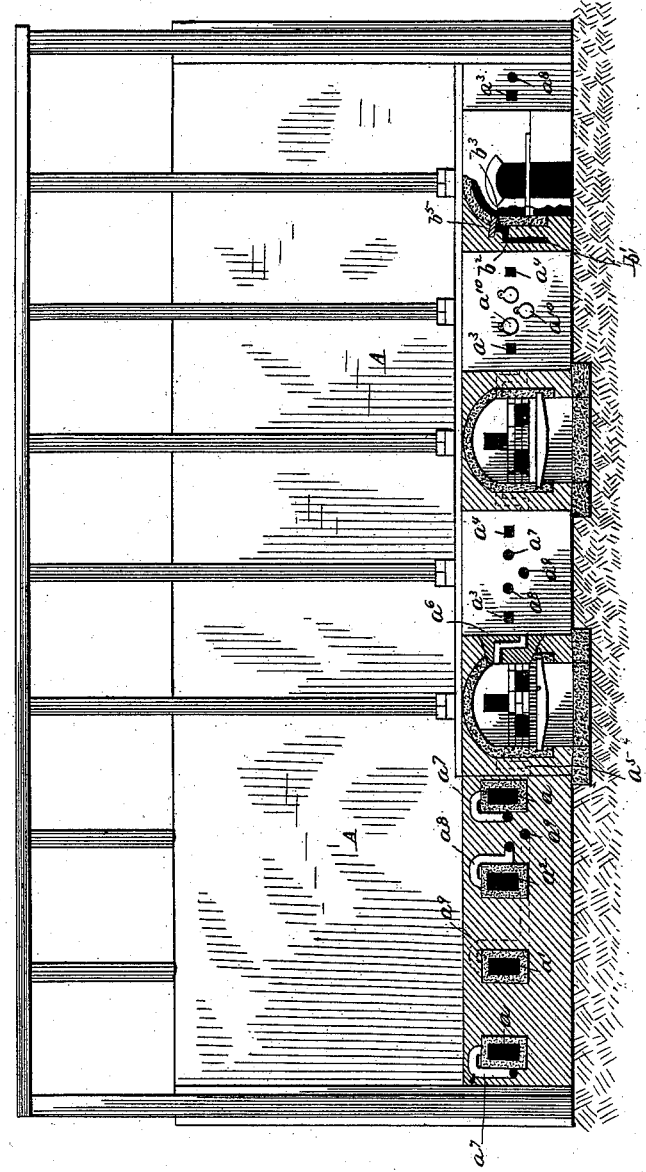
Figure 3:
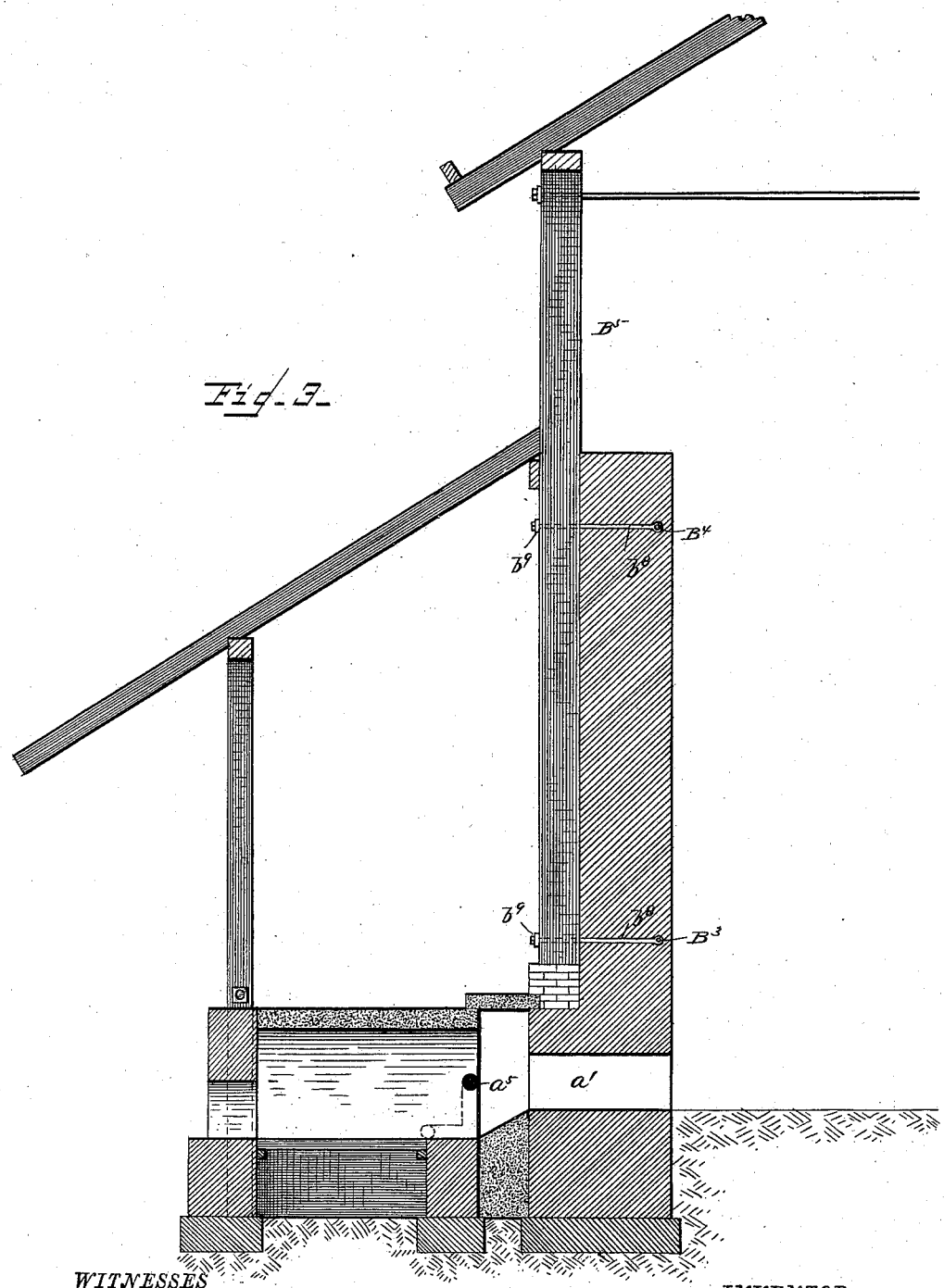
Figure 4:
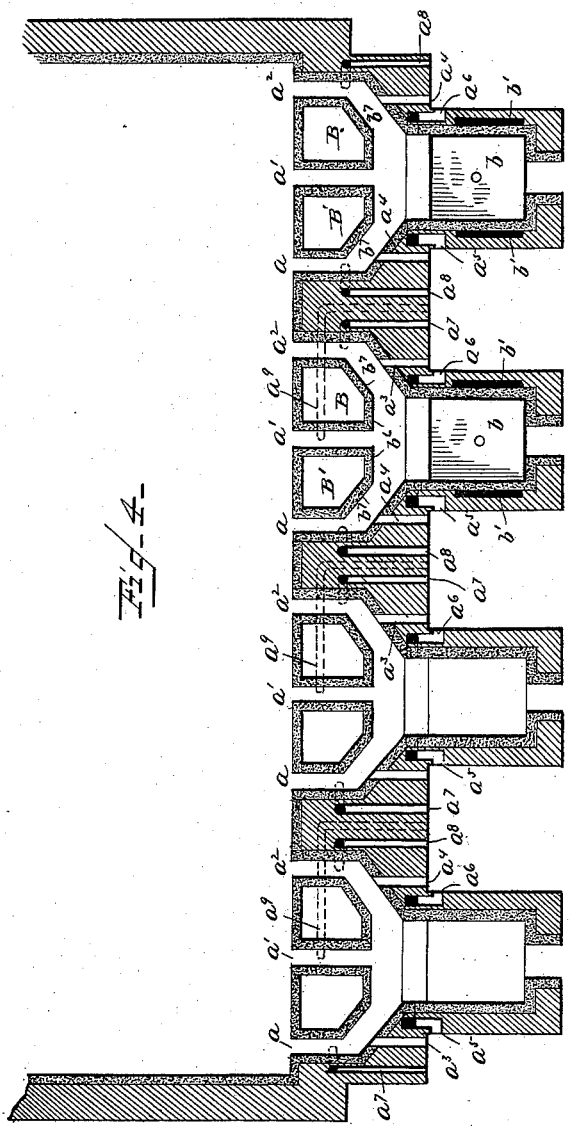
Figure 5:
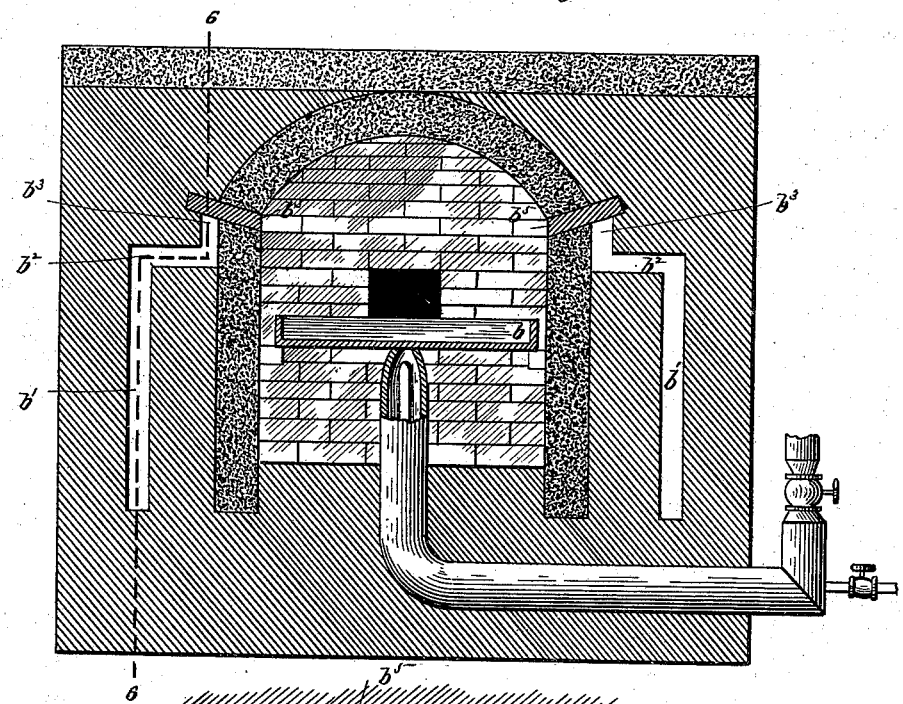
Figure 6:
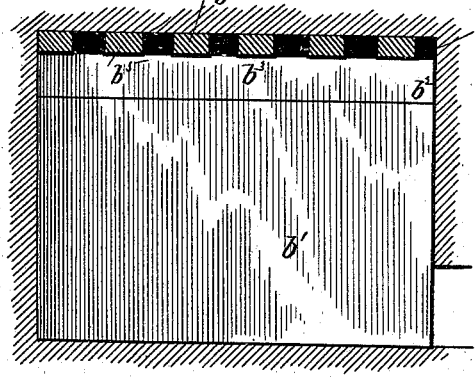

Figure 1 represents a perspective of my kiln with parts of the furnace broken away to show the air-flues; Fig. 2, a front elevation with parts broken away to show the air-flues; Fig. 3, a transverse section through one of the furnaces; Fig. 4, a horizontal section of several furnaces taken on different lines; Fig. 5, a transverse section of the furnace adapted to use oil; and Fig. 6, a section on line 6 6, Fig. 5.

A represents the kiln, having eyes $a$ $a'$ $a^2$, arranged in sets, each of which opens into the combustion-chamber $A'$ of the furnaces $A^2$, which are provided with the usual appurtenances. Each furnace has two peep holes, $a^3$ $a^4$, which respectively lead into the combustion-chamber at a point opposite the eyes $a$ and $a^2$. Near the rear end, at each side of the furnace, are formed the air-passages $a^5$ $a^6$, which begin near the bottom and terminate just back of the grate and on a line with the skewback. In that part of the wall between the furnaces passages $a^7$ $a^8$ $a^9$ are formed. Passage $a^7$ leads inwardly to a point opposite to the eye $a$, and is then deflected upwardly to a point above the eye $a$, and then brought down through the upper wall of the eye. Passage $a^8$ is brought in through the wall between the first and second furnace and deflected inwardly and over to and into the top of eye $a^2$. Passage $a^9$ is located below passages $a^7$ and $a^8$, and passes into the wall on a horizontal line between passages $a^7$ and $a^8$, and is deflected at right angles under eye $a^3$ into the abutment B, and then upwardly alongside of eye $a'$, and then into the upper wall of the said eye.

It will be seen from the foregoing description and the drawings that the air is admitted into each eye at the top—the point of greatest heat in said eyes—and the draft is thus effectually checked. To prevent the air from passing through when not desired, caps $a^{10}$, having a pivotal attachment on the wall, are placed over each opening, and when desired can be removed from the mouth of the openings, so that the air can pass in to check the draft.

It may often be desirable to construct the furnace to burn petroleum or other hydrocarbons, and the form of fire-box and abutments shown in the drawings are particularly adapted therefor. It will be noted that the fire-boxes on the right-hand side of the device shown in Figs. 1, 2, and 4 are particularly designed for this purpose. This construction is shown more fully in detail in Figs. 5 and 6.

Instead of a grate, a pan, $b$, to receive oil and water from any suitable source and fed by the supply-pipe shown, is placed in the fire-box. Air necessary for combustion may be admitted around the pan; but I prefer to form a vertical passage, $b'$, and a horizontal passage, $b^2$, which is connected by a second vertical passage, $b^3$, with a chamber, $b^4$, having subdivisions formed by bricks placed crosswise, and opening into the fire-box in the side walls of the furnace to supply the air necessary for combustion.

To get the best result from this fuel, the abutments B B' are formed with facets $b^6$, which are immediately in front of the fire-box, and facets $b^7$, which extend obliquely and rearwardly from the facets $b^6$ and serve to form the flues leading to the side eyes. The object of the facets $b^6$ is to compel the products of combustion to rebound into the combustion-chamber $B^2$, and thus compel the thorough intermingling of the gaseous fuel from the burner and the air admitted through the side walls of the furnace.

In the front wall of the kiln are placed two rods, $B^3$ $B^4$, from which rods $b^8$ project outwardly through the uprights $B^5$, which are secured in place by the nuts $b^9$.

I am aware that hot air has been introduced into the combustion-chamber for the purpose of increasing the combustion, and make no claim thereto, as my device differs from that class of devices in that the object sought to be accomplished is entirely different, to wit: to check the draft which is accomplished by introducing cold air into the eyes, in the manner heretofore described.

What I claim as new is—

1. In a brick-kiln, the combination of a furnace, the wall of the kiln having eyes connecting the furnace with the interior of the kiln, and cold-air passages in the wall of the kiln and opening into said eyes through the top wall of the latter, substantially as described.

2. In a brick-kiln, the combination of a furnace, the wall of the kiln having eyes connecting the furnace with the interior of the kiln, and the cold-air passages, one leading to each eye, and the one leading to the middle eye passing under one of the other eyes, substantially as described.

3. In a brick-kiln, the combination of a furnace, the wall of the kiln having eyes connecting the furnace and the interior of the kiln, and cold-air passages leading from the open air into the eyes, and the passage to the middle eye passing around one of the side eyes, substantially as described.

4. In a brick-kiln, the combination of a furnace having passages $b'$ $b^2$ $b^3$ and chamber $b^4$, subdivided by bricks, and the front wall of the furnace having abutments provided with eyes and facets $b^6$ and $b^7$ and abutting in the combustion-chamber of the furnace.

In testimony whereof I affix my signature in presence of two witnesses.

GEO. W. SHARER.

Witnesses:
SAML. C. MILLS,
M. F. HALLECK.